United States Patent
Rabie et al.

(10) Patent No.: US 6,592,759 B2
(45) Date of Patent: Jul. 15, 2003

(54) GEL POTTING METHOD AND METHOD TO REDUCE TWINNING FOR FILTERING HOLLOW FIBER MEMBRANES

(75) Inventors: Hamid Rabie, Mississauga (CA); Marshal Deane, Selkirk (CA); Robert Langerak, Burlington (CA); Steven Pedersen, Burlington (CA)

(73) Assignee: Zenon Environmental Inc., Oakville (CA)

( * ) Notice: Subject to any disclaimer, the term of this patent is extended or adjusted under 35 U.S.C. 154(b) by 29 days.

(21) Appl. No.: 09/847,338

(22) Filed: May 3, 2001

(65) Prior Publication Data

US 2001/0037967 A1 Nov. 8, 2001

Related U.S. Application Data

(60) Provisional application No. 60/202,848, filed on May 8, 2000.

(30) Foreign Application Priority Data

May 5, 2000  (CA) ............................................. 2308234

(51) Int. Cl.[7] .............................. B01D 63/00; C02F 1/44
(52) U.S. Cl. ............................. 210/321.61; 210/321.8; 210/321.78; 210/321.87; 210/321.88; 210/321.89; 210/321.9
(58) Field of Search .......................... 210/636, 321.69, 210/321.8, 500.23, 356, 258, 321.78, 321.88, 321.89, 321.9; 264/258, DIG. 48; 156/242, 245, 145

(56) References Cited

U.S. PATENT DOCUMENTS

| | | |
|---|---|---|
| 3,339,341 A | 9/1967 | Maxwell et al. |
| 3,708,071 A | 1/1973 | Crowley ..................... 210/321 |
| 3,730,959 A | 5/1973 | Horres, Jr. et al. |
| 3,734,989 A | 5/1973 | Leonard et al. |
| 4,315,819 A | 2/1982 | King et al. ............... 210/321.3 |
| 5,174,900 A | 12/1992 | Nichols et al. |
| 5,480,553 A | 1/1996 | Yamamori et al. .......... 210/650 |

(List continued on next page.)

FOREIGN PATENT DOCUMENTS

| | | | |
|---|---|---|---|
| CH | 528347 | 9/1972 | |
| EP | 0931582 | 8/1997 | .......... B01D/63/02 |
| JP | 2000 334271 | 12/2000 | |
| WO | WO 00/06357 | 2/2000 | |

OTHER PUBLICATIONS

English Language Abstract of Japanese Patent Publication No. JP1151906, published on Jun. 14, 1989.
English Language Abstract of Japanese Patent Publication No. JP3131324, published on Jun. 4, 1991.
English Language Abstract of Japanese Patent Publication No. JP5269354, published on Oct. 19, 1993.
English Language Abstract of Japanese Patent Publication No. JP7024272, published on Jan. 27, 1995.

*Primary Examiner*—W. L. Walker
*Assistant Examiner*—K S Menon
(74) *Attorney, Agent, or Firm*—Bereskin & Parr

(57) ABSTRACT

To pot membranes in a header, a dense, viscous liquid, suspension or, preferably, a thixotropic, water soluble gel, is placed in a header pan in space reserved for a permeate channel. A plurality of hollow fiber membranes are collected together and their open ends are inserted into the gel. A fixing liquid, typically a resin, is placed over the gel. The fixing liquid surrounds each membrane and then solidifies, simultaneously sealing the outer surfaces of the membranes and forming a plug in the opening of the header to complete the permeate channel. After the fixing liquid has solidified, the gel is removed by various means. The space initially occupied by the gel becomes part of the permeate channel after the gel is removed. In one embodiment, membranes are grouped by a cushioning adhesive which later surrounds the membranes where they exit the completed header.

13 Claims, 2 Drawing Sheets

U.S. PATENT DOCUMENTS

| | | |
|---|---|---|
| 5,554,283 A | 9/1996 | Brinda et al. ............ 210/321.8 |
| 5,639,373 A | 6/1997 | Mahendran et al. ........ 210/636 |
| 5,695,702 A | 12/1997 | Niermeyer |
| 5,922,201 A | 7/1999 | Yamamori et al. ..... 210/321.79 |
| 6,042,677 A | 3/2000 | Mahendran et al. ........ 156/242 |
| 6,270,714 B1 * | 8/2001 | Azran et al. ............. 264/328.1 |

* cited by examiner

GEL POTTING METHOD AND METHOD TO REDUCE TWINNING FOR FILTERING HOLLOW FIBER MEMBRANES

FIELD OF THE INVENTION

This invention relates to methods of potting filtering hollow fibre membranes into a header and to headers of potted hollow fibre membranes.

BACKGROUND OF THE INVENTION

In order to filter or permeate with hollow fibre membranes, a large number of thin hollow fibres must be fixed to a header such that their outer surfaces are each completely sealed to the outside of header but their lumens are open to an inner space in the header. The inner space of the header is then connected to a source of suction or pressure to create a transmembrane pressure across the walls of the membranes.

In U.S. Pat. No. 5,639,373, the ends of an array of spaced apart fibres are submerged in a fugitive liquid, such as a wax, until the fugitive liquid solidifies around them. A fixing liquid, such as a resin, is then poured over the fugitive liquid and allowed to harden around the membranes. The fugitive liquid is then removed, for example by heating or by dissolution, leaving the lumens of the membranes open to the space formerly occupied by the fugitive liquid. In U.S. Pat. No. 6,042,677, a similar process is used but the array of fibres is held in a bed of powder which is used in place of the solidified fugitive liquid.

In U.S. Pat. No. 5,922,201, a continuous hollow fibre is made into a fabric such that adjacent lengths of the fibres are spaced apart from each other and do not have open ends. An edge of the fabric is inserted into a pot of liquid resin which is centrifuged or vibrated as it cures to encourage flow into the spaces between the fibres. After the resin is cured, the block of resin and fibre is cut to separate the fabric into individual lengths of fibres having open ends. The block of resin is then glued or attached through gaskets to the remainder of a header. The use of a centrifuge and the need to later attach the cured block of resin to the remainder of the header add to the cost and complexity of the method. Further, the ends of the fibres may be damaged when the fibres are cut while encased in resin.

In European Patent Application No. EP 0 931 582, an elastic pipe is used as a header. An aperture is cut in the pipe and a weir is built up around the aperture. Open ends of hollow fibre membranes are inserted spaced apart in a line into the aperture by first pulling the aperture open and then allowing it to close on the membranes. Liquid resin is poured over the ends of the membranes and retained in placed by the weir until it cures. Surface tension prevents the resin from flowing through the aperture in spaces between adjacent fibres but only a single layer of fibres are potted in each aperture.

SUMMARY OF THE INVENTION

The inventors have observed various difficulties with the method in U.S. Pat. No. 5,639,373. One difficulty is that the fugitive liquid wicks up the fibres to a certain wicking height. In order to secure a good bond to the outside of the fibres, the fixing liquid is applied to a depth that exceeds, by a required distance, the wicking height of the fugitive liquid. With large diameter fibres, around 2.0 mm outside diameter for example, the wicking height is about 2 to 10 mm. This requires some excess fixing liquid to be used at some increase in cost but the amount of excess fixing liquid is manageable. With smaller diameter fibres, for example about 1.0 mm outside diameter or less, the wicking height of the fugitive liquid can be 5 to 20 mm. Particularly at these wicking heights, the required excess thickness of the fixing liquid becomes significant and undesirable.

Another difficulty with the U.S. Pat. No. 5,639,373 method is that the fibres are organized into a spaced apart relationship before insertion into the fugitive liquid. This is done because the fugitive liquid, when solidified, holds the fibres in whatever relationship that exists when the fibres are placed in the fugitive liquid. Although a very deep layer of the fixing liquid might adequately separate a random arrangement of fibres fixed in the solidified fugitive liquid, pre-spacing the fibres is a preferred solution even though it adds a step to the U.S. Pat. No. 5,639,373 process.

Yet another difficulty with the U. S. 5,639,373 process is that the fugitive liquid is often difficult to work with. Solidified fugitive liquids that are dissolved with a solvent generate solvent handling and disposal concerns and limit the choice of permeate pan material to those that do not react with the solvent. Solidified fugitive liquids that are to be melted are typically made of a wax so that their melting temperature is low. Waxes, however, react with many otherwise suitable permeate pan materials and may also produce manageable but undesirable minor reactions with useful fixing resins. For these reasons, permeate pans for use with the U.S. Pat. No. 5,639,373 process are typically made of expensive fibreglass reinforced plastics.

Finally, there is sometimes a difficulty in potting headers with "fibre twinning." In fibre twinning, the fixing liquid wicks up the fibres by 1 to 2 cm before it hardens and joins two (or possibly a few) fibres together for a short distance above the top of the header. Thus, one side of the base of a fibre may be attached to another fibre while the other side of the base of the fibre is not contained in solidified fixing liquid. Under intense aeration or physical handling of the membranes (typically, unintentionally during shipping or maintenance or intentionally as part of physical de-sludging) the base of the fibre may be bent towards its uncontained side. The fibre may be damaged if it rips free of the resin that bonds it to a neighbouring fibre. In particular, where composite membranes are used (such as a coated braid as described in U.S. Pat. No. 5,472,607 or a polysulfone membrane coated with PVDF), the outer layer may stick to the resin while the remainder of the fibre pulls free. Since the outer coating typically contains the smallest pores, a defect is created in the fibre. The inventors have observed fibre twinning with the method in U.S. Pat. No. 5,639,373 but believe that it is likely present in all of the prior art methods described above. The inventors expect that fibre twinning may be less of a concern with centrifuged headers, although in those cases the cost and complexity of centrifuging is itself a concern. In summary, the inventors have noticed many areas in which membrane potting technology, including the process in U.S. Pat. No. 5,639,373, may be improved.

It is an object of the present invention to improve on the prior art. This object is met by the combination of features, steps or both found in the claims. The following summary may not describe all necessary features of the invention which may reside in a sub-combination of the following features or in a combination with features described in other parts of this document.

In various aspects, the invention provides a method of potting filtering hollow fibre membranes into a header. A plurality of hollow fibre membranes are collected together and their open ends are inserted into a dense, viscous liquid, suspension or, preferably, a gel in a container. The gel has sufficient viscosity and surface tension such that it does not wick up the fibres significantly and sufficient density to remain below a fixing liquid, typically an uncured resin, to be placed above the gel. The fixing liquid surrounds each membrane and then becomes a solid sealingly connected to the outside of each membrane but not blocking the lumens of the membranes.

The membranes preferably have outside diameters of about 1 mm or less, for example between 0.5 and 0.7 mm. The plurality of hollow fibre membranes may be arranged before they are potted randomly in a bundle. If randomly arranged before potting, the packing density and membrane and gel material are preferably selected such that the gel tends to disperse the membranes and create a desired closely spaced arrangement. The fixing liquid also wets the membranes and further separates them from each other. Since the ends of the membranes are only partially constrained by the gel, the fixing liquid may surround and space the membranes even if some membranes initially touch each other in the gel. Alternatively, the membranes can be pre-arranged to be closely spaced apart before inserting their open ends into the gel, particularly if a pre-determined spacing is desired.

Preferably, the potting method is performed in the header. Header pans are prepared of a material which is substantially unreactive with the fixing liquid or the gel. This typically includes a broad range of materials of which ABS is preferred because of its low cost, durability and ease of molding or fabricating into a desired shape. Header pans are prepared with an opening to an inner space defining a permeate channel. The gel is placed in the header in the space reserved for the permeate channel. The open ends of the membranes are then inserted into the gel. The fixing liquid is placed over the gel. When the fixing liquid solidifies, it simultaneously seals the outer surfaces of the membranes and forms a plug in the opening of the header pan to complete the permeate channel. After the fixing liquid has solidified, the gel is removed. The solidified fixing liquid remains attached to the header pan in a position where the open ends of the membranes can be in fluid communication with the permeate channel. The space initially occupied by the gel becomes part of the permeate channel after the gel is removed.

Preferably, the fixing liquid is a resin which continues to cure after it has solidified and a substantial portion of the gel is permitted to flow as a gel out of the header while the resin cures. The remaining gel can be removed by dissolving it or by mechanical means such as flushing with water. Further, the gel may be and is preferably thixotropic and can be removed in part by vibrating the gel to a liquid state. A thixotropic gel can also be vibrated to assist in placing the gel evenly in the header. The gel is also soluble in a solvent that does not dissolve the solidified fixing liquid. The solvent is preferably water and the gel may also be removed in part by dissolving the gel in the solvent. The gel may also be heated to assist in placing it in the header or later removing it.

In another aspect, filtering hollow fibre membranes are potted in a header by first preparing a group of preferably closely spaced hollow fibre membranes surrounded and held together by a layer of solidified adhesive. The layer of solidified adhesive is located near the ends of the fibres but with the ends of the fibres extending beyond a first side the adhesive. A fixing liquid is placed around the membranes such that the fixing liquid extends from the periphery of the adhesive towards the ends of the membranes. The fixing liquid surrounds each membrane at least at a point between the adhesive and the open end of each membrane. The fixing liquid becomes a solid sealingly connected to the outside of each membrane but not blocking the lumens of the membranes and not contacting the membranes where they exit from a second side of the adhesive. The solidified fixing liquid is attached to a header pan in a position where the open ends of the membranes can be in fluid communication with a permeate channel in the header.

The adhesive is chosen to be water insoluble and durable in a solution of any chemicals likely to be present in a substrate to be filtered. The adhesive preferably does not wick up the membranes to any significant degree and the adhesive/fibre bond is preferably weaker than the bond between any layers of a composite fibre. A suitable adhesive is polyethylene hot melt adhesive such as a mix of ethelene vinyl acetate co-polymers when used with fibres having an outer surface of polysulfone, polypropylene or PVDF. The mix of adhesive components is preferably chosen using techniques known to those skilled in the art to be fairly soft and flexible so as to cushion the membranes where they exit the second side of the adhesive.

BRIEF DESCRIPTION OF THE DRAWINGS

Preferred embodiments of the present invention will now be described with reference to the following figures.

DETAILED DESCRIPTION OF EMBODIMENTS

Gel Potting

The Figures show headers 17 for a membrane module containing hollow fibre filtering membranes 10. The membranes 10 typically have a pore size in the microfiltration or ultrafiltration range, preferably between 0.003 and 10 microns and more preferably between 0.01 and 1.0 microns. The membranes 10 have each an open end 12 at which the lumen of the membrane 10 is open to any adjacent space. The membranes 10 can be made, for example, of cellulose acetate, polypropylene, polyethylene, polysulfone or a complex of PVDF and calcined .alpha.-alumina particles. In order to produce a large surface area, the membranes 10 preferably have outside diameters in the range of 0.2 mm to 2.0 mm.

Figure 1:
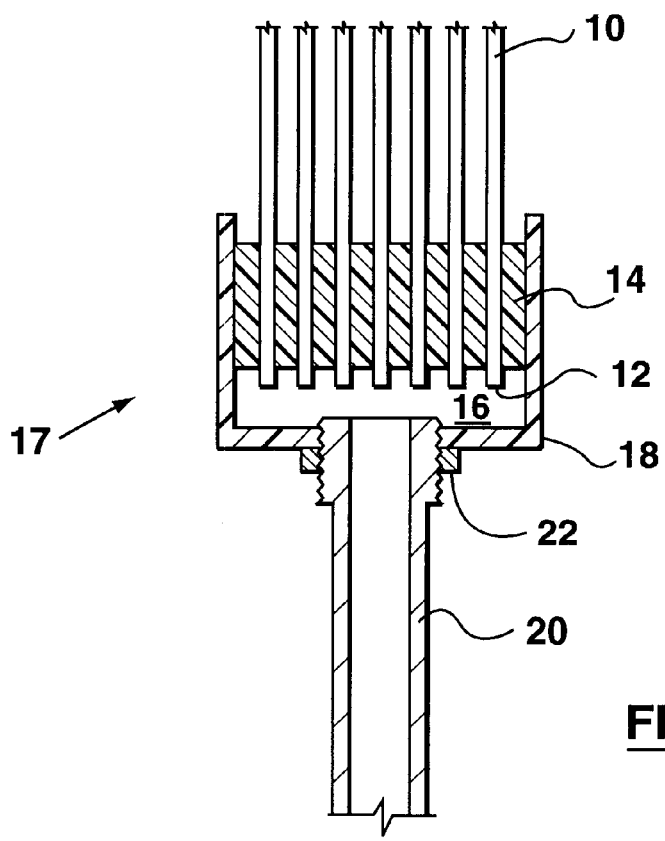
FIG. 1 is a partial cross section of a completed header.

FIG. 1 shows a completed header 17. The membranes 10 are held in a closely spaced apart relationship in a plug of a fixing liquid such as a resin 14 which encloses one or more permeate channels 16 in a header pan 18. The header pan 18 is typically moulded of a suitable plastic. The resin 14 surrounds each membrane 10 for at least a portion of its length in the resin 14. This seals the outer surface of each membrane 10 so that water cannot enter the permeate channel 16 other than by passing through the walls of the membranes 10 and into their lumens. The open ends 12 of the membranes 10 extend into the permeate channel 16 and put the lumens of the membranes 10 in fluid communication with the permeate channel 16. A permeate pipe 20 is tapped to the header pan 18 and locked with a nut 22 to connect the permeate channel 16 with a source of negative pressure. With the membranes 10 immersed in water, the negative pressure in the permeate channel 16 and the lumens of the membranes 10 draws filtered permeate through the walls of the membranes. Alternatively, the water around the outside of the membranes 10 may be pressurized to drive water through the walls of the membranes 10. Further alternatively, feed water may be forced under pressure into the lumens of the membranes 10 to force filtered permeate to the outside of the membranes 10 in which case the permeate channel 16 becomes a feed channel.

Figure 2:
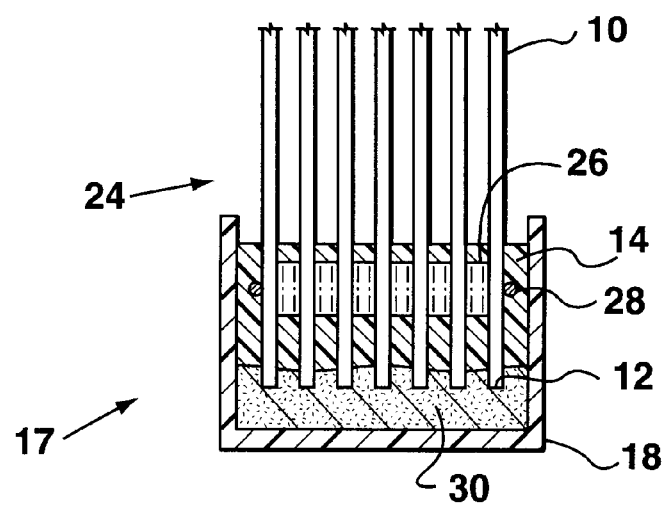
FIG. 2 is a partial cross section of a partially completed header.

FIG. 2 shows a header 17 being assembled according to a first embodiment. A header pan 18 is laid open side up on a table and filled to about 10 to 20 mm with a gel 30. The gel 30 has a low enough viscosity to be placed in a layer on the bottom of the header pan 18 and to be generally self-levelling once in the header pan 18 but sufficient viscosity not to wick up the membranes 10 or be temporarily displaced significantly when the resin 14 is placed over it later. Temporary displacement of the gel 30 may also be minimized by placing the resin 14 over the gel 30 in layers, typically about 10 cm thick each. Typical viscosities for the gel 30 range from 300 to 600 poise. The gel 30 is also denser than the resin 14 so that the resin 14 floats over the gel 30.

A preferred gel 30 is polymethyl acrylate diluted with propylene glycol or glycerine to achieve the desired viscosity. Many gels 30, including polymethyl acrylate diluted with propylene glycol or glycerine, may also be diluted with water to achieve very low viscosity if necessary, but this is not preferred because hydrophillic fibres may cause the water to leave the gel 30 and wick up the membranes 10. Water also reacts adversely to some resins, such as polyurethane resins, which is not desired. Other gels 30 may also be used including gels that are not thixotropic. Preferred gels 30, which include polymethyl acrylate diluted with appropriate amounts of propylene glycol or glycerine as mentioned above, are those that are stable in any heat given off by curing resin 14, are water soluble, are thixotropic, and can be made to have the viscosity dependent characteristics described in this specification. Other materials such as dense, viscous liquids or suspensions including thixotropic clays or thick oils, resins or slurries might also be used.

If necessary, the temperature of the gel 30 may be raised to lower the viscosity of the gel 30 without causing a phase change. This makes the gel easier to flow into the header pan 18 and improves the self levelling characteristics of the gel 30. Similarly, the gel 30 may be heated later to make it easier to flow out of the header pan 18. An increase in temperature of 5 C to 10 C for example, can cause a 10–20% decrease in viscosity of polymethyl acrylate diluted with appropriate amounts of propylene glycol or glycerine. Because of the effect of heat on viscosity, there is a possibility that the heat of the resin 14 as it cures could detrimentally effect the viscosity of the gel 30. In the inventors'experience, however, the curing heat has not caused a problem with moderate cure time resins without the need to cool the resin, for example with heat sinks, forced air circulation or refrigeration.

The header pan 18 is preferably made of ABS plastic which is relatively inexpensive, easily molded or fabricated into an appropriate shape, does not react appreciably with most gels 30, and bonds well to most resins 14.

The gel 30 is pumped into the header pan 18, preferably with a gear pump or positive displacement pump. With a nozzle nearly as wide as the opening of the header pan 18, the gel 30 can be placed to a generally even depth, it not being necessary to leave a completely smooth upper surface. A thixotropic gel 30 can also be vibrated to temporarily liquify it and then allowed to re-form, but this is not typically necessary.

A group 24 of membranes 10 is made having of a plurality of layers of membranes 10, six layers being illustrated. Methods of forming such a group 24 of membranes is known in the art, having been described at least in U.S. Pat. No. 5,639,373. Another suitable method which uses an adhesive to form a group is described further below. The membranes 10 are closely spaced apart either regularly or randomly within a layer and the layers are separated by spacers 26 having a desired thickness, typically between 0.5 and 1 times the outside diameter of the membranes 10. The group 24 is held together by a band 28 wrapped around the membranes 10 and spacers 26 and the membranes may also be attached to the spacers with adhesive. Groups 24 of other shapes may also be made. For example, cylindrical groups can be made by rolling up one or more layers of membranes 10.

The group 24 is inserted into the header pan 18 such that the open ends 12 of the membranes 10 are inserted into the gel 30 to a depth of about 5 to 10 mm. Liquid resin 14 is then poured to a desired depth, typically about 20 to 50 mm and preferably covering the spacers 26. The spacers 26 preferably do not penetrate into the gel 30. Suitable resins 14 include polyurethane, epoxy, rubberized epoxy and silicone resin. One or more resins 14 may also be used in combination and applied in one or more coats to meet objectives of strength and providing a soft interface with the membranes 10 having no cutting edges. The resin 14 must also be water insoluble, durable in a solution of any chemicals likely to be present in the water to be filtered and non-reactive with the membrane material.

The liquid resin 14 may wick down the membranes 10 slightly, but the gel 30 prevents the resin 14 from reaching the lumens of the membranes 10. The liquid resin 14 surrounds the membranes 10 and then cures sealing the outsides of the membranes 10 to the header pan 18. The gel 30 is then removed to leave a permeate channel 16 (as shown in FIG. 1) between the resin 14 and the walls of the header pan 18. The lumens of the membranes 10 are left in fluid communication with the permeate channel 16. Further, since the gel 30 does not react appreciably with the resin 14, the bottom surface of the resin 14 remains uncompromised, at least when polyurethane is the resin 14 and polymethyl acrylate diluted with appropriate amounts of propylene glycol or glycerine is the gel 30.

The gel 30 is removed by one or more of flowing it out in the gel state, optionally with the assistance of heat or vibration, mechanically flushing it and dissolving it, preferably with water. In a preferred method, an opening is made in the permeate channel, such as the opening to admit the permeate pipe 20 shown in FIG. 1. A small air vacuum relief tube is inserted into the header pan 18 to prevent a vacuum from forming in the header pan 18 which might otherwise inhibit or prevent the gel 30 from leaving. The header pan 18 is then tilted to pour the gel 30 out through the opening with the gel 30 still in a gel state. These steps can begin after the resin 14 has become solid but before it is fully cured and continue while the resin 14 cures. Over a curing time of several hours, roughly one half to three quarters of the gel 30 can be collected. This first collected gel 30 is most easily recycled and, accordingly, it is desirable to maximize the amount of gel 30 collected by simply flowing it out of the header 18. Next, the completed module is placed in a tank such that the membranes 10 are immersed in water. A vacuum is applied to the permeate channel 16 to permeate water for about 20 minutes. This mechanically flushes particles of gel 30, particularly small plugs of gel 30 in the lumens of the membranes 10. Next, any remaining gel 30 is dissolved and removed which may be done by dissolving the gel 30 with permeate during testing or start up procedures before the module is put on line. Alternatively or additionally, a tube carrying pressurized water, pressurized air or both may be inserted through the opening and into the gel 30 to assist in moving the gel 30 or to partially liquify it. Further alternatively or additionally, a thixotropic gel 30 can be vibrated to reduce its viscosity and increase its rate of flow.

Figure 3:
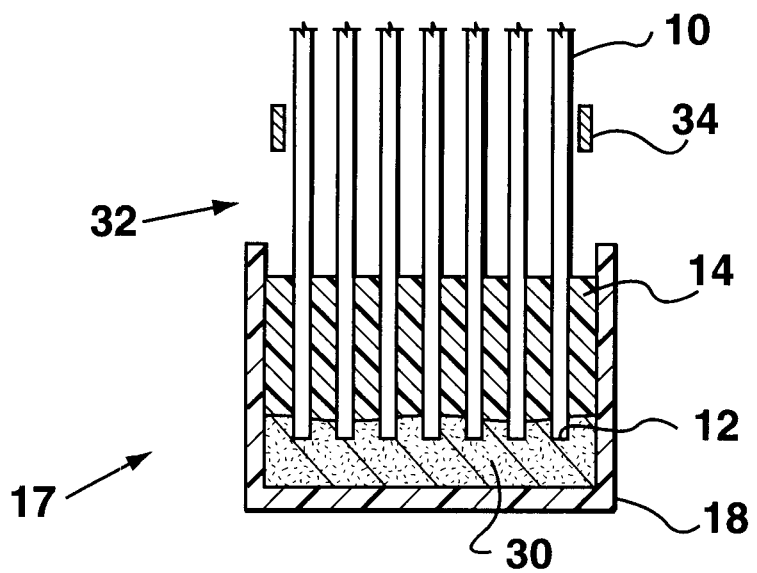
FIG. 3 is a partial cross section of another partially completed header.

FIG. 3 shows a header 17 being assembled according to a second embodiment. The second embodiment is preferred over the first, particularly for fibres having an outside diameter of about 1 mm or less. In the second embodiment, membranes 10 are arranged in a bundle 32 and loosely held by a releasable collar 34. The collar 34 is generally of the same shape as the header 17, which is typically rectangular or round. The bundle 32 is produced by winding fibre material on a drum and then cutting the material to create distinct membranes 10 but without purposely arranging the membranes 10 in a grid or matrix. The open ends 12 of the membranes 10 are placed into gel 30 in a header pan 18 as described above. The collar 34 is then removed and resin 14 is poured into the header 18 pan. After the resin 14 cures, the gel 30 is removed, as described above.

In this second embodiment, there are no spacers to force the membranes 10 into a closely spaced apart relationship. However, the gel 30 tends to spread the membranes 10 as they are inserted into the gel 30. Nevertheless, there is a possibility that resin 14 may not flow between adjacent membranes 10 and not completely seal those membranes 10. However, by selecting resins, membrane materials, membrane diameter, depth of resin (typically 20 to 50 mm) and packing density which allow the resin 14 to wet each membrane 10, successful potting is achieved. The resin 14 will wet the membranes 10 with sufficient force to separate the membranes 10 in at least part of the depth of the resin 14. Since the gel 30 is not solid, it resists but does not prevent the membranes 10 from moving and being separated by the resin 14. Factors or selections which encourage full wetting are known in the art. For example, U.S. Pat. No. 4,605,500 describes appropriate factors or selections to pot a random bundle of hollow fibre membranes into a resin.

In this second embodiment, packing density (defined as the cross sectional area of the membranes 10 divided by the cross sectional area filled by the membranes 10) preferably ranges from 15% to 30%. Membrane outside diameter is preferably about 1 mm or less, typically 0.5 mm to 0.7 mm. Polyurethane resin has good wetting characteristics with PVDF membranes although epoxy, rubberized epoxy and silicone rubber are also suitable. With these parameters, resin 14 depths of 20 to 50 mm have resulted in reliable, defect free potting.

Reducing Membrane Fibre Twinning

Figure 4:
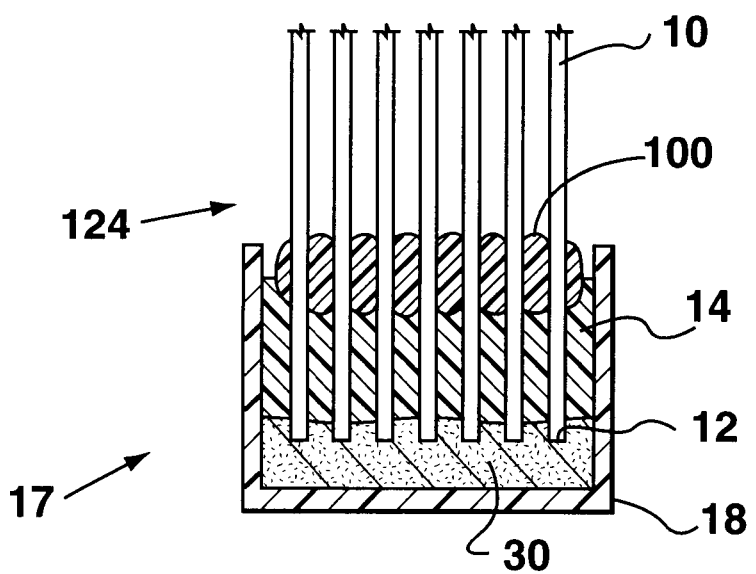
FIG. 4 is a partial cross section of another partially completed header.

FIG. 4 shows a header 17 being assembled according to a third embodiment. In this embodiment, membranes 10 are arranged in a second group 124 having a plurality of membranes 10 surrounded by a solidified adhesive 100 near the ends 12 of the membranes 10. The ends 12 of the membranes 10 extend beyond the adhesive. The membranes 10 are generally separated and individually surrounded by solidified adhesive 100 although, with a sufficient depth of a suitable resin 14 it is permissable, but not preferred, for membranes 10 to be touching each other in the solidified adhesive 100 provided that the overall packing density is not too high, preferably not over about 25%. Preferably, the membranes 10 are closely spaced apart either regularly or randomly within layers separated roughly by a desired thickness, typically between ¼ to ¾, more typically between ⅓ to ½, of the outside diameter of the membranes 10. The adhesive 100 is water insoluble, durable in a solution of any chemicals likely to be present in a substrate to be filtered and substantially non-reactive with the membrane material or resin 14.

The bond between the adhesive 100 and the membranes 10 is weaker than all of the materials of the membranes 10 and all bonds between materials in the membranes 10. Thus, if a membrane 10 is pulled away from the adhesive 100, the bond between the adhesive 100 and the membrane 10 breaks before the membrane 10 is damaged. The adhesive 100 is also preferably sufficiently soft, flexible and non-brittle so as to cushion the membranes 10 where they exit the header 17. A preferred adhesive 100 is polyethylene hot melt adhesive made of a blend of ethelyne vinyl acetate co-polymers. The mix of adhesive components is preferably chosen using techniques known to those skilled in the art to achieve the properties described above. Other adhesives which will not wick up the membranes 10 appreciably before it cures, has the characteristics of bond to the membranes 10 described above, cushions the membranes and is otherwise substantially unreactive with the membranes 10, substrate to be filtered and the resin 14 might also be sued. For example, thick, fast-curing epoxy resins with aluminum oxide or other additives to make the cured epoxy more flexible, might be used.

The second group 124 is formed of a number of layers of membranes. A layer is formed by placing a desired number of membranes 10 onto a surface coated or covered with a strip of material that will not adhere to the adhesive 100. The membranes 10 may have already been cut to length and have open ends or may be all continuous as in a fabric or a series of loops of fibres. The membranes 10 are preferably laid down so as to be spaced apart from each other by either random or, more preferably, regular width spaces. A strip of adhesive 100 of about 2–3 cm in width is placed across the membranes 10 near any place where ends of the membranes 10 will be potted according to this embodiment but leaving space for the open ends 12 of the membranes 10 to extend beyond the adhesive 100. A groove may be made in the surface below where the adhesive 100 will be laid down if necessary to allow the adhesive to surround the membranes 10. Optionally, the adhesive may be re-melted with an iron to help the adhesive surround each membrane but the adhesive is re-solidified before it can wick up the membranes appreciably. After a desired number of layers have been made, the layers are put together at the bands of adhesive 100 to form the second group 124. The layers may be simply clamped together or glued together with more adhesive 100. If the membranes 10 will be potted using a fugitive material, the membranes 10 are preferably cut open before the layers are put together into the second group 124 if they were not cut open before being formed into layers. With minor variations to the procedure above, a group of membranes 10 can be produced for headers 17 of various shapes. For example, a group of membranes 10 for a round header 17 can be made by rolling one or more sheets of membranes 10 into a cylinder if a sufficiently flexible adhesive is used or by sizing each sheet as a slice of a cylinder.

The second group 124 may be potted using various techniques. For example, the second group 124 may be placed into a container holding a depth of resin 14. The second group 124 is immersed in the resin 14 such that the ends of the membranes 10 are covered by the resin 14 and the adhesive 100 is partially, typically about half way, submerged in the resin 14. Thus resin 14 extends from the periphery of the adhesive 100 towards the ends of the membranes which protrude from a first side of the adhesive 100. The resin 14 surrounds each membrane 10 for at least a portion of its length in the resin 14 between the adhesive 100 and the end of each membrane 10. When the resin 14 solidifies, it sealingly connects to the outside of each membrane 10 but does not contact the membranes where they exit on top of the adhesive 100. Preferably, the ends of the membranes 10 will have been placed in the fixing liquid unopened. The block of solidified fixing liquid is cut to open the ends of the membranes 10. The solidified fixing liquid is attached to a header pan in a position where the open ends of the membranes can be in fluid communication with a permeate channel in the header.

Preferably and as shown in FIG. 4, however, the second group 124 is potted into a fugitive material. More preferably, the second group 124 is potted into a fugitive gel 30 generally as described further above. The second group 124 is inserted into a header pan 18 such that the open ends 12 of the membranes 10 are inserted into the gel 30 to a depth of about 5 mm. The adhesive 100 is not inserted into the gel 30. Liquid resin 14 is then poured to a desired depth which surrounds the periphery of the adhesive 100, and preferably extends about one half of the way to the top of the adhesive 100, but does not flow over the top of the adhesive to contact the membranes 10 on top (or second side) of the adhesive 100.

Using any of the potting methods above, the adhesive 100 continues to surround the membranes 10 at the point where they are first constrained by the header 17. This provides a softer interface with the membranes 10 at this point and prevents the resin 14 from causing fibre twinning.

What has been described are preferred embodiments of the invention. In particular, and without limitation, the methods may be adapted to potting shelled modules, for example modules in which membranes 10 are contained in a pressurizable vessel. For such modules, a cap or end of the module is the permeate pan 18, fugitive liquids or a gel 30 are pumped into or removed from the module through the cap or module end, and an access hole is provided in the side of the module for pumping resin 14 into the module above the level of the gel 30. The invention is susceptible to other changes and alternative embodiments without departing from the subject invention, the scope of which is defined in the following claims.

We claim:

1. A method of potting hollow fibre membranes in a header comprising the steps of:
    (a) collecting a plurality of hollow fibre membranes together into a group wherein the membranes are surrounded by a solidified adhesive near the ends of the membranes but with the ends of the membranes extending beyond a first side of the solidified adhesive;
    (b) after step (a), inserting the ends of the membranes into a container,
    (c) after or during step (b), placing fixing liquid around the membranes and allowing the fixing liquid to solidify such that the solidified fixing liquid,
        (i) extends from the adhesive towards the ends of the membranes;
        (ii) surrounds each membrane at a point between the adhesive and the end of each membrane;
        (iii) sealingly connects to the outside of each membrane; and,
        (iv) does not contact the membranes where they exit from a second side of the adhesive; and,
    (d) attaching the solidified fixing liquid to a header such that open ends of the membranes can be in fluid communication with a permeate channel in the header.

2. The method of claim 1 wherein any bond between the solidified adhesive and the membranes is less strong than all of the materials in the membrane and any and all bonds between materials in the membranes at any time after them membranes are potted.

3. The method of claim 1 further comprising the steps of
    (a) before step (c) of claim 1 inserting the ends of the membranes into a fugitive material in the container; and wherein,
    (b) the fixing liquid in step (c) of claim 1 is placed around the membranes by pouring it into the container onto the fugitive material while the fugitive material is held in the container; and,
    (c) the fugitive material is separated from the fixing liquid after the fixing liquid has solidified.

4. The method of claim 3 wherein
    (a) the container is the header pan and the fugitive material is placed in the header pan before the ends of the membranes are inserted into the fugitive material;
    (b) the solidified fixing liquid is attached to the header pan by solidifying the fixing liquid in the header pan;
    (c) the fugitive material is separated from the fixing liquid after the fixing liquid has solidified by removing the fugitive material from the header pan; and,
    (d) the space initially occupied by the fugitive material becomes part of the permeate channel after the fugitive material is removed.

5. The method of claim 4 wherein the fugitive material is a dense liquid, suspension or gel.

6. The method of claim 5 wherein the fugitive material is a gel.

7. The method of claim 1, wherein the adhesive is a hot melt adhesive.

8. The method of claim 1 wherein the adhesive is a hot melt adhesive made of a blend of ethelyne vinyl acetate co-polymers.

9. The method of claim 8 wherein the blend of the adhesive is chosen to cushion the membranes at the point where they exit the adhesive.

10. A header of potted filtering hollow fibre membranes comprising:
    (a) a plurality of hollow fibre membranes each having at least one open end collected together into a group wherein (i) the membranes are surrounded by a solidified adhesive near the ends of the membranes, (ii) the open ends of the membranes extend beyond a first side of the solidified adhesive, and (iii) a bond between the solidified adhesive and the membranes is less strong than all of the materials in the membrane and any and all bonds between materials in the membranes;
    (b) cured resin around the membranes extending from the solidified adhesive to a point at or near the ends of the membranes, the cured resin (i) surrounding each membrane for at least a portion of its length in the resin between the solidified adhesive and the end of each membrane, (ii) sealingly connected to the outside of each membrane, (iii) not blocking the open ends of the membranes and (iv) not contacting the membranes on a second side of the solidified adhesive;

(c) a header pan secured to the cured resin in a position where the open ends of the membranes are in fluid communication with a permeate channel in the header, wherein the resin extends to and is secured directly to the header pan and separates the solidified adhesive from the header pan.

11. The header of claim 10 wherein the adhesive is a hot melt adhesive.

12. The header of claim 11 wherein the hot melt adhesive is made of a blend of ethelyne vinyl acetate co-polymers.

13. The header of claim 12 wherein the blend of the adhesive is chosen to cushion the membranes at the point where they exit the adhesive.

* * * * *